United States Patent
Glitza

(10) Patent No.: US 9,151,013 B2
(45) Date of Patent: Oct. 6, 2015

(54) MOBILE WORKING MACHINE COMPRISING A POSITION CONTROL DEVICE OF A WORKING ARM, AND METHOD FOR CONTROLLING THE POSITION OF A WORKING ARM OF A MOBILE WORKING MACHINE

(75) Inventor: Oliver Glitza, Kassel (DE)

(73) Assignee: Robert Bosch GmbH, Stuttgart, DE (US)

( * ) Notice: Subject to any disclaimer, the term of this patent is extended or adjusted under 35 U.S.C. 154(b) by 879 days.

(21) Appl. No.: 13/265,278

(22) PCT Filed: Apr. 7, 2010

(86) PCT No.: PCT/EP2010/002165
§ 371 (c)(1),
(2), (4) Date: Jan. 9, 2012

(87) PCT Pub. No.: WO2010/121713
PCT Pub. Date: Oct. 28, 2010

(65) Prior Publication Data
US 2012/0099955 A1    Apr. 26, 2012

(30) Foreign Application Priority Data

Apr. 20, 2009 (DE) .......................... 10 2009 018 070

(51) Int. Cl.
*G06F 19/00* (2011.01)
*E02F 3/43* (2006.01)
(Continued)

(52) U.S. Cl.
CPC ................. *E02F 3/435* (2013.01); *E02F 3/844* (2013.01); *E02F 3/845* (2013.01); *E02F 9/2037* (2013.01); *E02F 9/264* (2013.01); *G01C 9/00* (2013.01); *G01C 9/06* (2013.01)

(58) Field of Classification Search
CPC ......... E02F 3/434; E02F 3/437; E02F 9/2037; E02F 9/2203; E02F 9/26; E02F 9/264; E02F 3/844; E02F 3/845; E02F 9/0808; G01C 21/16; G01C 21/10; G01C 21/165; G01C 9/00

USPC ......... 701/50; 702/94, 95, 151, 154; 414/743, 414/687, 697; 700/245, 251, 262
See application file for complete search history.

(56) References Cited

U.S. PATENT DOCUMENTS 4,910,673 A * 3/1990 Narisawa et al. ................ 701/50
5,424,623 A * 6/1995 Allen et al. .............. 318/568.18
(Continued)

FOREIGN PATENT DOCUMENTS

DE      201 16 666 U1   2/2003
EP      1 416 095       5/2004
(Continued)

OTHER PUBLICATIONS

International Search Report corresponding to PCT Application No. PCT/EP2010/002165, mailed Sep. 16, 2010 (German and English language document) (10 pages).

*Primary Examiner* — Thomas G Black
*Assistant Examiner* — Sze-Hon Kong
(74) *Attorney, Agent, or Firm* — Maginot, Moore & Beck LLP

(57) ABSTRACT

A mobile working machine includes a working arm which is mounted in an articulated manner, by a first end, on a revolving superstructure of the working machine, and a tool which is mounted in a displaceable manner on a second end of the working arm. The mobile working machine includes a position control device of a working arm. At least one inclination sensor is arranged on the revolving superstructure and at least one inclination sensor is arranged on the working arm. Also, at least one rotation rate sensor is arranged on the working arm. The working machine further includes a calculation unit for processing the signals of the at least one inclination sensor, of at least one additional inclination sensor, and of at least one rotational rate sensor.

20 Claims, 4 Drawing Sheets

(51) Int. Cl.
*E02F 3/84* (2006.01)
*E02F 9/20* (2006.01)
*G01C 9/00* (2006.01)
*G01C 9/06* (2006.01)
*E02F 9/26* (2006.01)

(56) References Cited

U.S. PATENT DOCUMENTS

| | | | |
|---|---|---|---|
| 5,735,066 A * | 4/1998 | Tochizawa et al. | 37/348 |
| 5,823,369 A * | 10/1998 | Kuromoto | 212/273 |
| 5,854,988 A | 12/1998 | Davidson et al. | |
| 6,098,322 A * | 8/2000 | Tozawa et al. | 37/414 |
| 6,377,906 B1 * | 4/2002 | Rowe | 702/151 |
| 6,518,519 B1 * | 2/2003 | Crane et al. | 177/136 |
| 6,691,437 B1 | 2/2004 | Yost et al. | |
| 7,292,000 B2 * | 11/2007 | Saotome et al. | 318/568.12 |
| 7,650,252 B2 * | 1/2010 | Douglas | 702/95 |
| 7,698,020 B2 * | 4/2010 | Kawai et al. | 700/245 |
| 7,912,612 B2 * | 3/2011 | Janardhan et al. | 701/50 |
| 7,993,091 B2 * | 8/2011 | Osanai et al. | 414/697 |
| 8,082,084 B2 * | 12/2011 | Nichols | 701/50 |
| 8,145,391 B2 * | 3/2012 | Omelchenko et al. | 701/50 |
| 8,155,844 B2 * | 4/2012 | Peters | 701/50 |
| 8,271,229 B2 * | 9/2012 | Hsu et al. | 702/174 |
| 8,352,132 B2 * | 1/2013 | Omelchenko et al. | 701/50 |
| 8,660,758 B2 * | 2/2014 | Janardhan et al. | 701/50 |
| 2003/0173151 A1 * | 9/2003 | Bodtke et al. | 182/18 |
| 2004/0136821 A1 | 7/2004 | Berger et al. | |
| 2006/0085116 A1 * | 4/2006 | Suzuki et al. | 701/50 |
| 2009/0099738 A1 * | 4/2009 | Danko | 701/50 |
| 2009/0312974 A1 * | 12/2009 | Douglas | 702/93 |
| 2012/0143433 A1 * | 6/2012 | Budde et al. | 701/30.3 |

FOREIGN PATENT DOCUMENTS

| | | |
|---|---|---|
| EP | 2 042 276 | 4/2009 |
| WO | 99/35462 | 7/1999 |
| WO | 01/57474 | 8/2001 |

* cited by examiner

MOBILE WORKING MACHINE COMPRISING A POSITION CONTROL DEVICE OF A WORKING ARM, AND METHOD FOR CONTROLLING THE POSITION OF A WORKING ARM OF A MOBILE WORKING MACHINE

This application is a 35 U.S.C. §371 National Stage Application of PCT/EP2010/002165, filed Apr. 7, 2010, which claims the benefit of priority to Application Serial No. DE 10 2009 018 070.2, filed Apr. 20, 2009 in Germany.

BACKGROUND

The disclosure relates to a mobile working machine, for example an excavator, a truck with a superstructure, or an agricultural and forestry device comprising at least one working arm. Working arms of such working machines usually have a plurality of segments interconnected in an articulated fashion, a tool such as a bucket, a gripper or a hammer being fitted on a segment, also called a shank.

The current position and attitude of the working arm and, in particular, also of the tool is frequently indicated to the operator of such a working machine on a display, the operator thereby being enabled to carry out work according to accurately prescribed plans, and receives direct feedback relating to achieved levels, lengths, depths or inclinations, for example of a bulk material or soil which has been moved, or of the underlying ground which is to be shaped or has already been shaped.

Such operator displays are known, for example, from DE 201 16 666 U1 and U.S. Pat. No. 5,854,988 A.

In this case, the position and the attitude of the tool are frequently determined, partly because of the good retrofitting possibility, by inclination sensors that are fitted on the individual segments of the working arm. The position and attitude of the tool can then be calculated from the inclinations of the individual arm segments via the known geometric relationships of the kinematic chain comprising, for example, adjustable boom, boom, shank and tool.

Since, however, sensors based on the measurement principle of inertia such as, for example, gravitation-sensitive pendulums, are used as inclination sensors, they are frequently also sensitive to accelerations due to shocks and vibrations such as occur unavoidably when such work machines are used. Such motion-induced accelerations can substantially disturb or temporarily disable the measurement of the position and attitude of the tool. A known measure for suppressing these disturbances consists of a lowpass filtering of the sensor signals such that motion-induced accelerations outside the useful frequency band are suppressed.

However, this is attended by a number of disadvantages: firstly, accelerations within the useful frequency band cannot be suppressed in this way, while secondly the lowpass filtering causes a temporal delay of up to a few hundred milliseconds which is, however, accepted, because it still enables an adequately accurate position display and does not hinder the manual operation of the working arm.

It is known from other technical fields to make use of a combination of acceleration-based inclination and rotation rate sensors to control the position of, for example, a robot, an aerodynamic vehicle or a vehicle. WO 01/57474 A1 discloses such a method, in which a quaternion representation is used to calculate a position.

SUMMARY

It is an object of the disclosure to specify a mobile working machine comprising a device for determining position that has adequately small delay times such that it can be used not only to display the position, but also to control the position of any working arm of the working machine. It is, however, not intended to restrict the dynamics of the working arm in this case.

It is a further object of the disclosure to specify a method for such control of position.

According to the disclosure, this object is achieved with the aid of the subject matter of the independent patent claims. Advantageous developments of the disclosure are the subject matter of the dependent patent claims.

A mobile working machine according to the disclosure comprising a position control device of a working arm has a working arm that is arranged in an articulated fashion, by a first end, on a revolving superstructure of the working machine. A tool is movably arranged on a second end of the working arm.

The working machine further has a number of sensors, specifically at least one inclination sensor arranged on the revolving superstructure, at least one further inclination sensor arranged on the working arm, and at least one rotation rate sensor arranged on the working arm. The working machine further comprises an arithmetic logic unit for processing the signals of the at least one inclination sensor, of the at least one further inclination sensor and of the at least one rotation rate sensor. Of course, however, the arithmetic logic units can also be accommodated in the sensor modules fastened on the arm.

In accordance with a basic idea of the disclosure, it should be possible to achieve delay times of at most approximately 250 ms for real-time control. However, this value can also vary as a function of the hardware installed for the working arm, and of the purpose of use. Lowpass filtering of the measured values, which is therefore accompanied by signal delay, should therefore be dispensed with. On the other hand, inclination sensors should be used as before, because these are relatively cost effective and robust and, moreover, can easily be retrofitted and are therefore particularly suitable for use on mobile working machines. In order to render the inclination measurement less susceptible to the already described disturbances due to motion-induced accelerations, additional use is made of rotation rate sensors. The latter have a high dynamic accuracy, although they are attended by problems such as offsets and noise. Rotation rate sensors that are used in avionic navigation and are based on the Sagnac effect as well as, for example, on the use of fiber-optical gyros are certainly very accurate. By contrast, micromechanical rotation rate sensors are, however, much less cost-effective and, above all, also more robust and therefore better suited for use on mobile working machines. Because of said drift problems with such rotation rate sensors, the latter are combined with inclination sensors, in accordance with the disclosure.

This solution has the advantage that it is tailored accurately to use on mobile working machines, because it exhibits sufficient accuracy for real-time control of the position of the working arm or of a tool fitted thereon, but at the same time can be implemented cost-effectively and is very robust and little prone to error. Real-time control is therefore possible by combining inclination sensors with a very good static accuracy and rotation rate sensors with a very good dynamic accuracy with the aid of a data fusion or estimation algorithm.

The working arm can have a number of segments interconnected in an articulated fashion, the tool being fitted, for example, on the end of the last segment. In each case, the working arm comprises at least one segment.

In one embodiment, a further inclination sensor and a rotation rate sensor are arranged on each segment.

In an alternative embodiment, two further inclination sensors and a rotation rate sensor are arranged on each segment. In the case of this embodiment, it is possible not only to measure a spatial component of the acceleration (for example in an x-direction), but it is simultaneously possible to measure two components (for example in x- and z-directions), and this improves the sensitivity of the measurement in specific inclination angle ranges.

The inclination sensors can be based on different measurement principles and have, for example, pendulum bodies and/or refracting liquid mirrors. They can also be designed as capacitive or conductometric inclination sensors, but preferably as micromechanical acceleration sensors.

The rotation rate sensors are designed, in particular, as micromechanical sensors.

The position control device is suitable for use in mobile working machines such as, for example excavators, telescopic loaders, excavator loaders, wheeled loaders, loading cranes or forestry machines.

In accordance with a further aspect of the disclosure, a method is specified for controlling the position of a working arm of a mobile working machine, the determination of position having the following steps: acceleration $\bar{a}$ acting on the working arm is determined. This can be performed, for example, in all three spatial directions, three components $a_x$, $a_y$ and $a_z$ being measured with the aid of three acceleration sensors. However, it can also suffice to measure only the acceleration in x- and z-directions. Assuming a working arm at rest, a first value $\theta_s$ for the inclination angle $\theta$ is calculated from the acceleration a acting on the working arm, the inclination angle $\theta$ being defined as an angle by which the working arm is inclined about a y-axis.

In this case, the following relationships are valid for the acceleration sensors fitted on the working arm, since a coordinate transformation from the rest system of the segments of the working arm or of the sensors into the rest system of the revolving superstructure is undertaken in order to determine the inclination angle $\theta$:

$$a_{x,S} = \dot{v}_x - \omega_z v_y + \omega_y v_z - g \sin\theta$$

$$a_{y,S} = \dot{v}_y + \omega_z v_x - \omega_x v_z + g \sin\phi \cos\theta$$

$$a_{z,S} = \dot{v}_z - \omega_y v_x + \omega_x v_y + g \cos\phi \cos\theta \qquad (1)$$

Here, a denotes the measured values of the sensors in the directions of the fixed-body axes x, y and z, and the index S characterizes the respective sensor. v denotes the velocity of the working arm, $\omega$ its angular velocity, and $\phi$ and $\theta$ the so-called Euler angles of roll angles and inclination angles. g denotes the acceleration due to gravity.

The respective first terms of the equations in (1) describe the acceleration resulting from a transformation of the entire working machine or of the working arm or segment, while the respective middle terms describe the acceleration resulting from a rotation of the entire working machine or of the working arm or segment. These terms thus respectively describe "disturbances" by contrast with the respective last term, because they relate to accelerations that do not result from the influence of the terrestrial gravitational field, and therefore do not reproduce the inclination of the corresponding sensor in the gravitational field.

Since, as emerges from the second row of (1), the acceleration sensor measuring in a y-direction measures only the abovementioned disturbances when roll angle $\phi$ vanishes, it is possible, if appropriate, also to dispense with it when the static case (working arm at rest) is assumed for the calculation of the first value $\theta$ for the inclination angle $\theta$. The acceleration signals described by the first and third rows of (1) are substantially disturbed by linear movements in x- and z-directions and by rotations about the y-axis (centripetal and coriolis terms).

The following procedure is adopted, for example, in order to calculate the first value $\theta$ for the information angle $\theta$ from the measured values of the acceleration sensors:

Assuming a working arm at rest, that is to say a static case, it follows from (1) that:

$$a_{x,S} = -g\sin\theta_s$$

$$a_{y,S} = \phi g \cos\theta_s$$

$$a_{z,S} = g\cos\theta_s, \qquad (2)$$

from which is derived the desired first value $\theta$ for the inclination angle $\theta$ in accordance with $$\tan\theta_S = -\frac{a_{x,S}}{a_{z,S}}. \qquad (3)$$

As follows from (2), it would also be possible to make a determination for an arm $\theta$ at rest by way of only one sensor in accordance with $$\sin\theta_S = -\frac{a_{x,S}}{g}. \qquad (4)$$

However, this is attended by the disadvantage that the range of values of $\theta$ is restricted to the interval $-90°\ldots90°$. At least for the shank of a working machine, that is to say for that arm segment on which the tool is fastened, and for the tool itself, this range of values is too small for describing the realistic relationships. In addition, the sensitivity of the measurement is low in this case because of the shallow gradient of the sine function near $-90°$ and $90°$. Instead of this, it is possible to apply to (2) the arctan function with two arguments ("a tan 2") with a measurement value between $-180°$ and $180°$.

The assumption of a working arm at rest has been made here in order to determine the first value $\theta$ for the inclination angle $\theta$. Given a working arm which has been moved and a possibly revolving superstructure of the working machine, the disturbances owing to the first and middle terms in (1) quickly become so large that determination of the inclination angle with the aid of (3) no longer delivers sufficiently accurate results. This procedure is therefore not adequate for real-time control of the position of the working arm.

For this reason, an angular velocity $\omega$ of the working arm, specifically at least one component $\omega_y$ of the rotation about the y-axis, is measured in addition. Specifically, there is further known from rigid body kinematics the following system of equations which relates the rotation rate or angular velocity $\omega$ to the Euler angles $\theta$, $\phi$ and $\psi$ and to the time derivatives thereof:

$$\dot{\vartheta} = \cos\phi \cdot \omega_y - \sin\phi \cdot \omega_z \qquad (5)$$

$$\dot{\phi} = \omega_x + \tan\vartheta\sin\phi \cdot \omega_y + \tan\vartheta\cos\phi \cdot \omega_z$$

$$\dot{\psi} = \frac{\sin\phi}{\cos\vartheta}\omega_y + \frac{\cos\phi}{\cos\vartheta}\omega_z$$

from which it follows that $$\dot{\vartheta} = \omega_y \qquad (6)$$

$$\dot{\phi} = \omega_x + \tan\vartheta \cdot \omega_z$$

$$\dot{\psi} = \frac{\omega_z}{\cos\vartheta}$$

for vanishing roll angles $\phi$.

It is thereby possible to obtain a second value $\theta_d$ for the inclination angle $\theta$ in the dynamic case by integrating the angular velocity $\omega_y$ over a period t:

$$\theta_d = \theta_0 + \int \omega_y dt.$$

However, the problem arises in this case that, for example, offset errors and sensor noise are continuously integrated, which results even after a relatively short time, in deviations from the true inclination angle $\theta$ which are so large that the accuracy of the measurement does not meet the requirements placed thereon. This is the case at least when use is made of micromechanical rotation rate sensors. Other sensors such as, for example, fiber optic gyro sensors would deliver a greater, and in many cases sufficient, accuracy. However, they have the disadvantage of high costs and a relatively low robustness, so that they are not well suited for, use on mobile working machines.

In order now to make use of the available means of the inclination sensors, on the one hand, which give a good description of the static case, and the rotation rate sensor, on the other hand, which gives a good description of the dynamic case, but exhibits drift problems over relatively large spaces of time, to obtain a sufficiently accurate value for the inclination angle $\theta$, an estimation algorithm is employed so as to obtain an estimate $\bar{\theta}$ for the true inclination angle d from the two values $\theta_s$ and $\theta_d$. Starting from the accelerations $a_{x,S}$ and $a_{z,S}$ measured in the x- and z-directions, the a tan 2 function is used in accordance with (3) to calculate the angle $\theta_s$ for the static case, which is then used as intermediate variable for integrating the rotation rate $\omega_y$. To this end, the difference between the result of integration and the intermediate value is fed back into the estimation algorithm. It is also possible in this way to reduce erroneous initial values $\theta_0$.

It is possible for this purpose to make use of estimation algorithms per se, for example Kalman filters, or to use observation methods known from automatic control engineering that can also additionally estimate if appropriate the offset error of the rotation rate sensor.

The result is an estimate $\bar{\theta}$ for the true inclination angle $\theta$.

The disclosed method has the advantage that it is possible with the aid of only three sensors—two acceleration sensors and one rotation rate sensor—to achieve a determination of the position of the working arm or of a specific point of the working arm, for example the suspension of the tool, with an accuracy that enables real-time control.

In one embodiment, the working arm has a plurality of segments being connected in an articulated fashion, and the determination of estimates $\bar{\theta}$ for the inclination angles is carried out individually for each segment, the index i standing for the corresponding segment.

In one embodiment, the position and the attitude of a tool fitted on the working arm of the mobile working machine is calculated from $\bar{\theta}$, and said tool is controlled if appropriate.

However, it is also possible to calculate the deflection of at least one hydraulic cylinder assigned to the working arm of the mobile working machine from $\bar{\theta}$ and to control said deflection if appropriate.

BRIEF DESCRIPTION OF THE DRAWINGS

Exemplary embodiments of the disclosure are explained in more detail below with the aid of the attached figures, in which.

DETAILED DESCRIPTION

Figure 1:
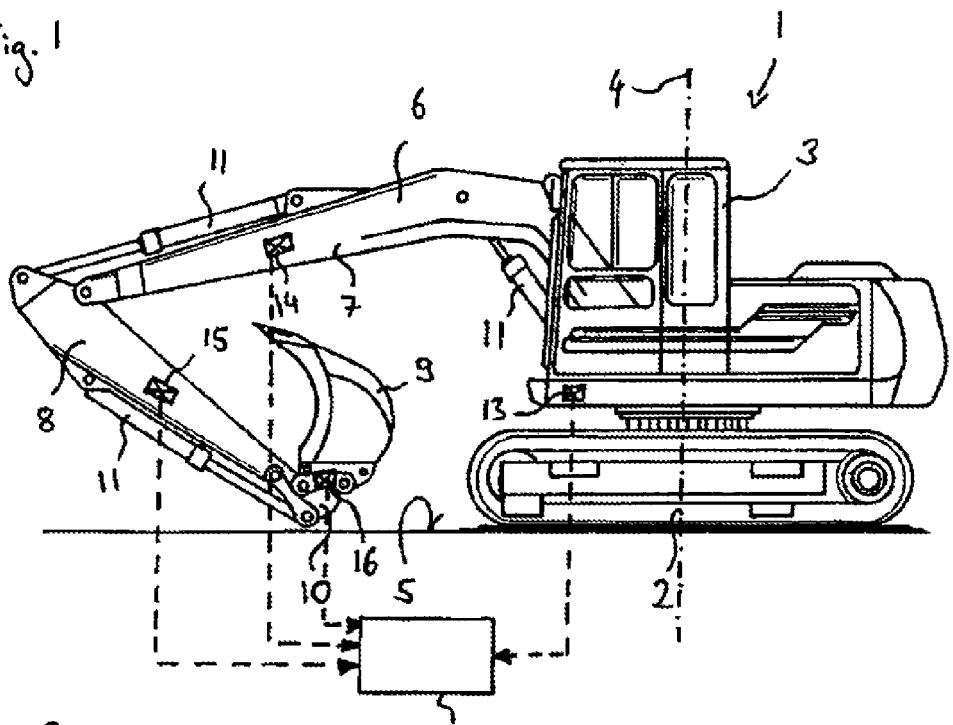
FIG. 1 is a schematic of a mobile working machine, designed as an excavator, in accordance with one embodiment of the disclosure.

Identical parts are provided with the identical reference numerals in all the figures.

FIG. 1 is a schematic of a mobile working machine 1 designed as an excavator. In this embodiment, the working machine 1 has a base part 2 that stands or moves on an underlying ground 5, and a revolving superstructure 3 that can be rotated about a vertical axis 4.

Connected to the revolving superstructure 3 in an articulated fashion is a working arm 6 that comprises a first segment 7 and a second segment 8 which are likewise interconnected in an articulated fashion. A tool 9 is coupled on the second segment 8, the fastening point of the tool 9 also being referred to as Tool Center Point (TCP) 10. Hydraulic cylinders 11 that respectively define an angle $\theta_i$ are arranged between the revolving superstructure and the first segment 7, between the segments 7 and 8 and between the second segment 8 and the tool 9.

Arranged on the revolving superstructure 3 is a sensor unit 13, on the first segment 7 a sensor unit 14, on the second segment 8 a sensor unit 15 and on the tool 9 a sensor unit 16. In this embodiment, each sensor unit 13, 14, 15 and 16 comprises two inclination sensors and a rotation rate sensor, the two inclination sensors measuring accelerations in the x- and z-directions, and the rotation rate sensor measuring an angular velocity of the rotation about the y-axis.

In an embodiment that is not shown, it is also possible to dispense with one of the inclination sensors per sensor unit, and the sensor unit assigned to the revolving superstructure 3 can also have only one, inclination sensor, but no rotation rate sensor if relatively few disturbances caused by movements of the revolving superstructure are to be expected.

The measured data of the sensor units 13, 14, 15 and 16 are fed to an arithmetic logic unit 17 of the mobile working machine 1, which undertakes to determine and control a position therefrom, particularly regarding the TCP 10, and to determine and control the attitude of the tool 9. The arithmetic control unit for determining position can, however, also be located in the sensor modules that are mounted on the arm.

Figure 2:
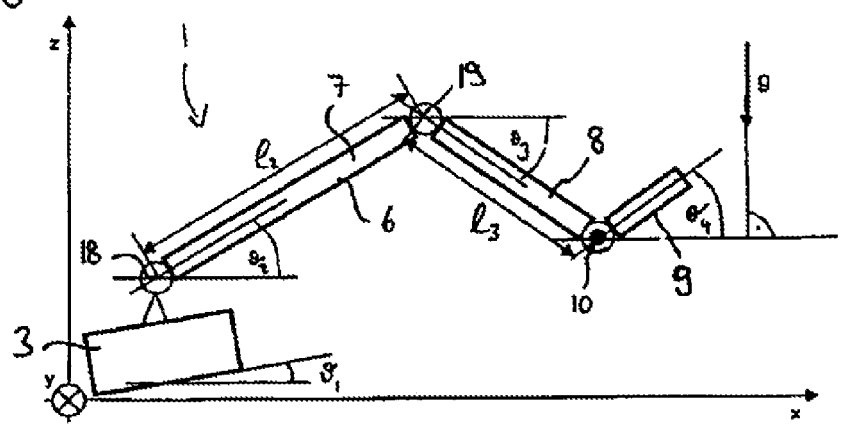
FIG. 2 is a schematic of the geometric relationships on a working arm of the working machine in accordance with FIG. 1.

FIG. 2 shows a schematic of the geometrical relationships on the working arm 6 of the mobile working machine 1 in accordance with FIG. 1.

The revolving superstructure 3 is inclined at an angle $\theta_1$, the first segment at an angle $\theta_2$, the second segment at an angle $\theta_3$, and the tool 9 at an angle $\theta_4$ with respect to the perpendicular to the direction of acceleration due to gravity g. The distances $l_2$ and $l_3$ between the first fulcrum 18 and the second fulcrum 19 or between the second fulcrum 19 and the TCP 10, which represent the lengths of the first segment 7 and of the second segment 8, are known, and so the position of the TCP 10 and the attitude of the tool 9 can be calculated with the aid of a determination of the inclination angle $θ_i$. That is to say, the geometrical (design) data of the arm segments are known in advance.

Figure 3:
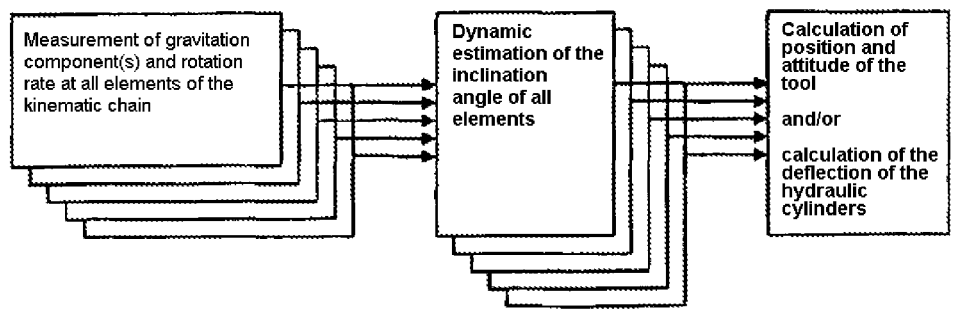
FIG. 3 shows a graph of the primary signal flow for embodiments of the control position in accordance with the disclosure.

FIG. 3 shows a graph of the primary signal flow for embodiments of the control position in accordance with the disclosure.

In this case, in a first step the accelerations are measured and the rotation rates at all elements of the kinematic chain are measured, that is to say at the revolving superstructure 3, at the first segment 7, at the second segment 8 and at the tool 9. The inclination angles $θ_i$ are determined dynamically from these measured values.

Finally, as illustrated in conjunction with FIG. 2, it is possible to use the inclination angles $θ_i$ to determine the position and the attitude of the tool 9. Alternatively or in addition, however, it is also possible to calculate the deflection of the hydraulic cylinder 11 therefrom.

Figure 4:
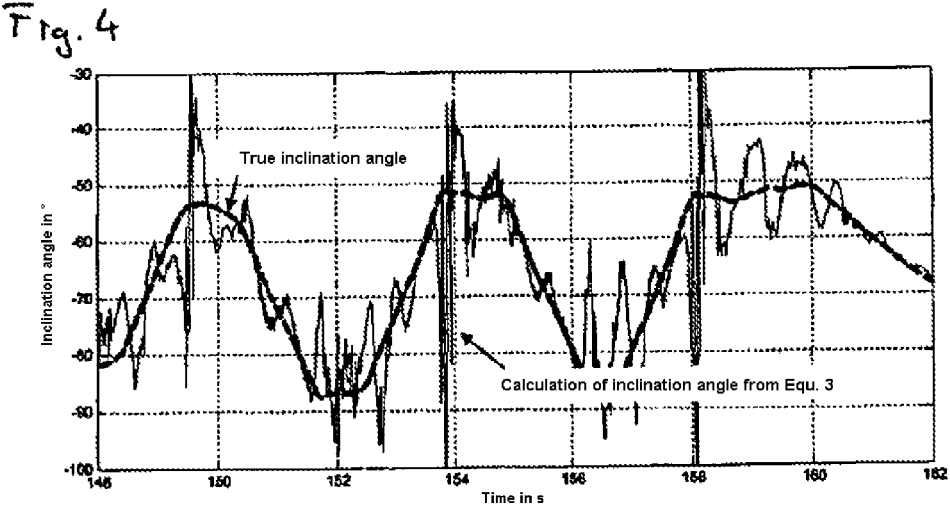
FIG. 4 shows a diagram of inclination signals disturbed by movements.

FIG. 4 shows a diagram of inclination signals disturbed by movements, such as results when the inclination angle is calculated solely from equation (3), that is to say exclusively with the aid of inclination sensors. Because of motion-induced accelerations, substantial deviations result in part between the calculated and the true inclination angles.

Figure 5:
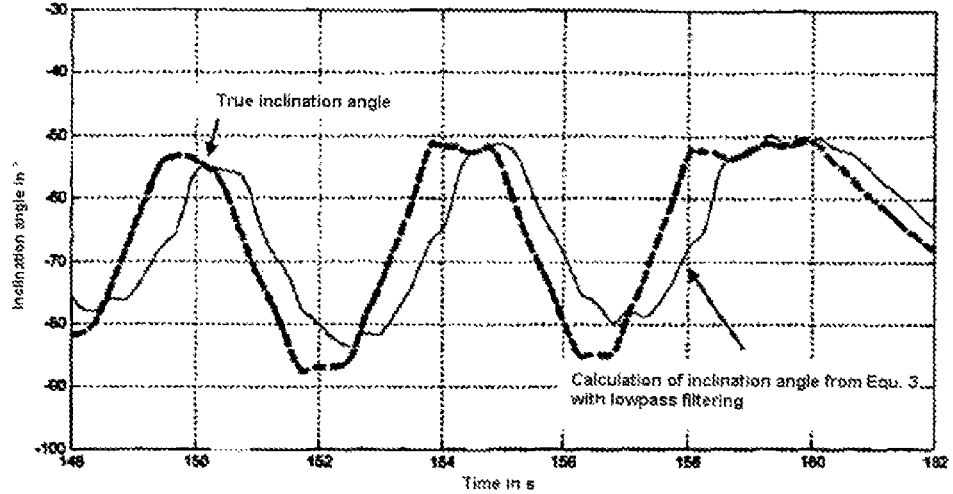
FIG. 5 shows a diagram of the determination of inclination angle with the aid of lowpass filtering.

FIG. 5 shows a diagram of the determination of the inclination angle from equation (3) with the aid of lowpass filtering, the time delay, caused by the lowpass filtering being made clear.

Figure 6:
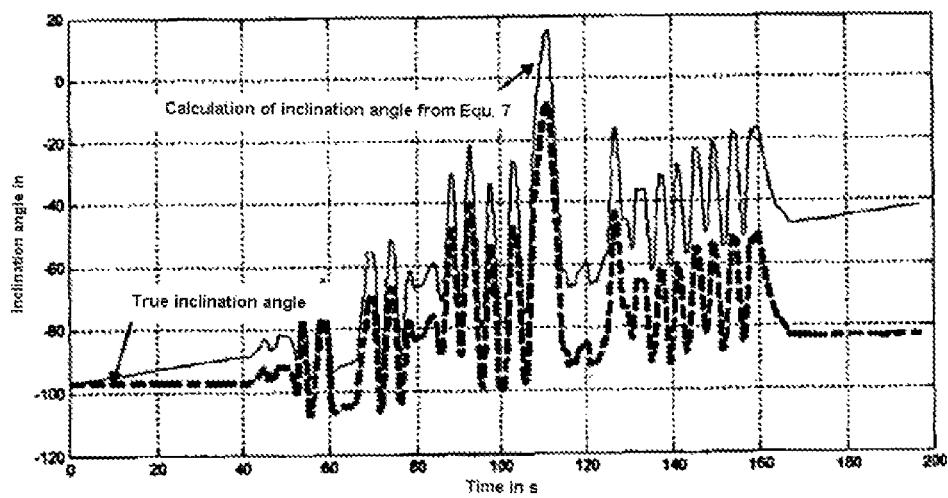
FIG. 6 shows a diagram of the drift-affected determination of inclination angle with the aid of a rotation rate sensor.

FIG. 6 shows a diagram of the drift-affected determination of inclination angle with the aid of a rotation rate sensor in accordance with equation (7), that is to say without the aid of inclination sensors.

Figure 7:
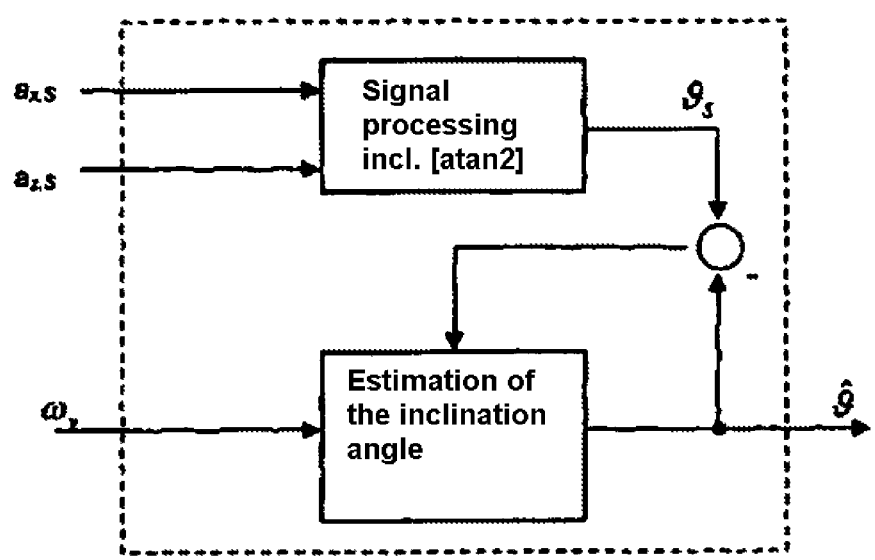
FIG. 7 is a schematic block diagram for estimating the inclination angle in accordance with the disclosure.

FIG. 7 shows a schematic block diagram for estimating the inclination angle 9 in accordance with the disclosure for an individual sensor unit, the measured values $a_{x,s}$ and $a_{z,s}$ of the inclination sensors of the sensor unit firstly being used to calculate a static inclination angle $θ_s$, and the measured value $ω_y$ of the rotation rate sensor of the same sensor unit being integrated in order to calculate a dynamic inclination angle $θ_d$. Subsequently, the difference between the static and dynamic inclination angles is fed back into the estimation algorithm in order to obtain an estimate $\overline{θ}$ for the inclination angle.

Methods known per se such as, for example, Kalman filters or observation methods or methods derived or modified therefrom are used in this case as estimation algorithm.

LIST OF REFERENCE NUMERALS

1 Working machine
2 Base part
3 Revolving superstructure
4 Axis
5 Underlying ground
6 Working arm
7 First segment
8 Second segment
9 Tool
10 Tool center point
11 Hydraulic cylinder
13 Sensor unit
14 Sensor unit
15 Sensor unit
16 Sensor unit
17 Arithmetic logic unit
18 First fulcrum
19 Second fulcrum

The invention claimed is:

1. A mobile working machine comprising:
   a working arm having an inclination angle relative to a y-axis;
   the working arm arranged on a revolving superstructure of the mobile working machine using a first end;
   a tool movably arranged on a second end of the working arm;
   a first inclination sensor arranged on the revolving superstructure;
   a second inclination sensor arranged on the working arm;
   a rotation rate sensor arranged on the working arm; and
   an arithmetic logic unit operatively connected to the first inclination sensor, the second inclination sensor, and the rotation rate sensor the arithmetic logic unit being configured to:
      identify an acceleration of the working arm with reference to signals from the first inclination sensor and the second inclination sensor;
      generate a first measurement of an inclination angle with reference to the acceleration of the working arm;
      identify a plurality of angular velocity measurements of the working arm with reference to signals from the rotation rate sensor over a predetermined time period;
      generate a second measurement of the inclination angle of the working arm with reference to the plurality of angular velocity measurements from the rotation rate sensor; and
      generate an estimate of the inclination angle of the working arm with reference to the first measurement and the second measurement of the inclination angle of the working arm.

2. The mobile working machine as claimed in claim 1, wherein the working arm comprises segments, wherein the segments are interconnected.

3. The mobile working machine as claimed in claim 2, further comprising a third inclination sensor and a second rotation rate sensor arranged on each of the segments.

4. The mobile working machine as claimed in claim 2, further comprising a third inclination sensor, a fourth inclination sensor, and a second rotation rate sensor arranged on each of the segments.

5. The mobile working machine as claimed in claim 1, wherein the first inclination sensor and the second inclination sensor include pendulum bodies.

6. The mobile working machine as claimed in claim 1, wherein the first inclination sensor and the second inclination sensor include refracting liquid mirrors.

7. The mobile working machine as claimed in claim 1, wherein the first inclination sensor and the second inclination sensor are capacitive.

8. The mobile working machine as claimed in claim 1, wherein the first inclination sensor and the second inclination sensor are conductometric inclination sensors.

9. The mobile working machine as claimed in claim 1, wherein the rotation rate sensor is a micromechanical sensor.

10. The mobile working machine as claimed in claim 1, wherein the mobile working machine is an excavator.

11. The mobile working machine as claimed in claim 1, wherein the mobile working machine is a telescopic loader.

12. The mobile working machine as claimed in claim 1, wherein the mobile working machine is an excavator loader.

13. The mobile working machine as claimed in claim 1, wherein the mobile working machine is a wheeled loader.

14. The mobile working machine as claimed in claim 1, wherein the mobile working machine is a forestry machine.

15. The mobile working machine as claimed in claim 1, wherein the mobile working machine is a loading crane.

16. A method for controlling a position of a working arm of a mobile working machine, the method comprising:
- identifying an acceleration of the working arm with reference to signals from a first inclination sensor and a second inclination sensor;
- generating a first measurement of an inclination angle with reference to the acceleration of the working arm, wherein the working arm is at rest and the working arm has the inclination angle relative to a y-axis;
- identifying a plurality of angular velocity measurements of the working arm with reference to signals from a rotation sensor over a predetermined time period;
- generating a second measurement of the inclination angle of the working arm with reference to the plurality of angular velocity measurements from the rotation rate sensor; and
- generating an estimate for the inclination angle from the first measurement and the second measurement of the inclination angle of the working arm.

17. The method as claimed in claim 16, wherein the working arm comprises segments, wherein the segments are interconnected and the estimate for the inclination angle from the first measurement and the second measurement is identified for each of the segments.

18. The method as claimed in claim 16, further comprising calculating a position and attitude of a tool fitting on the working arm of the mobile working machine with reference to the estimate for the inclination angle.

19. The method as claimed in claim 16, further comprising calculating a deflection of at least one hydraulic cylinder assigned to the working arm of the mobile working machine with reference to the estimate for the inclination angle.

20. The method as claimed in claim 16, wherein the identifying the first measurement includes identifying a coordinate transformation from segments of the working arm into a revolving superstructure of the mobile working machine, wherein the segments and the revolving superstructure are at rest.

* * * * *